(Model.)
E. E. HYATT.
CRANK COUPLING.
No. 289,266. Patented Nov. 27, 1883.
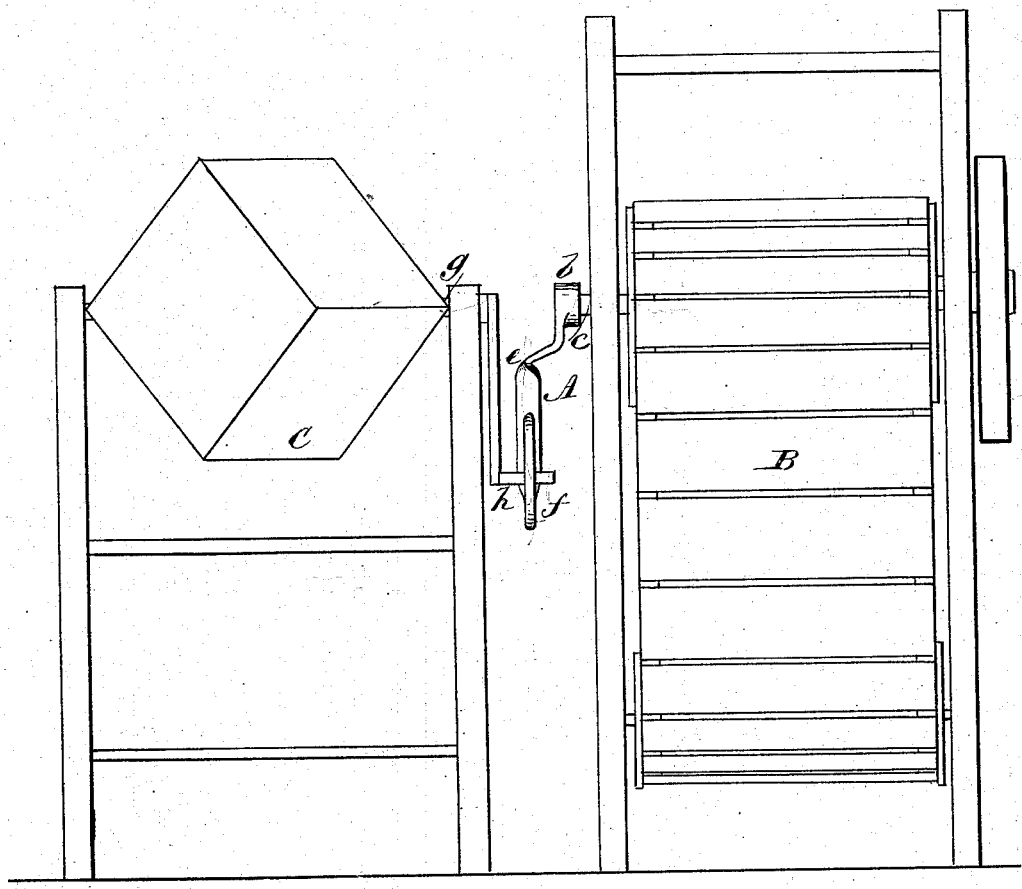
WITNESSES:
C. Neveux
B. G. Underwood
INVENTOR:
E. E. Hyatt,
BY Munn & Co
ATTORNEYS.

UNITED STATES PATENT OFFICE.

ELY E. HYATT, OF SALONA, ASSIGNOR TO THE ENTERPRISE MANUFACTURING COMPANY, OF TROY, PENNSYLVANIA.

CRANK-COUPLING.

SPECIFICATION forming part of Letters Patent No. 289,266, dated November 27, 1883.

Application filed August 2, 1883. (Model.)

*To all whom it may concern:*

Be it known that I, ELY E. HYATT, of Salona, in the county of Clinton and State of Pennsylvania, have invented certain new and useful Improvements in Crank-Couplings, of which the following is a full, clear, and exact description.

This invention is mainly designed for transmitting motion from the driving-shaft of dog and other small "powers" to machines of various kinds usually worked by hand with a crank, including revolving churns, fanning-mills, corn-shellers, and grindstones.

The invention consists in a slotted crank of peculiar construction, designed to be secured on the end of the driving-shaft of the power, or on the end of a counter-shaft driven by gearing or otherwise from the power, for engagement with the revolving hand-crank of the machine to be operated, whereby great convenience and several advantages are obtained, substantially as hereinafter described.

Reference is to be had to the accompanying drawings, forming part of this specification, in which similar letters of reference indicate corresponding parts in all the figures.

Figure 1 represents a front end view of an endless traveling platform dog or small animal power and a rotating rectangular box-churn with my improved crank-coupling applied to connect the driving-shaft of the power with the hand-crank of the churn; and Figs. 2 and 3 are longitudinal views in planes at right angles with each other, and upon a larger scale, of the improved crank-coupling or connecting-crank detached.

A indicates the connecting-crank, having its eye or hub $b$ keyed on the one end of the main or balance-wheel shaft $c$ of the power B in close proximity to the frame of the power; but it may be secured on the end of a longer driving-shaft for working at a distance from the power the machine to be driven, or on the end of a counter-shaft, as hereinbefore referred to.

This crank-coupling or connecting-crank A is somewhat longer than an ordinary hand-crank, or than the crank with which it is designed to engage, and is made with an elongated slot, $d$, extending from its outer or free end inward and in parallel relation, or nearly so, with the longitudinal axis of the hub $b$.

A simple mode of constructing this crank, when made of wrought-iron, is to bend it outward in proximity to the eye or hub, and then to give the metal a right-angled twist, as shown at $e$, and to draw out its body and turn or bend over the same at the outer end of the crank, and afterward to turn down or close the end of such turned-over portion against the body of the crank to form a guard, $f$, and the required slot $d$ between said guard and body. This slot $d$ should be wide enough to admit the handle of any ordinary hand-crank within it. The rotating rectangular box-churn C or other machine to be driven is placed in suitable position to bring its shaft $g$, on which is the hand-crank $h$, on a line, or nearly so, with the balance-wheel shaft $c$ of the power, and so that the handle of the crank $h$ will enter freely within the slot $d$ of the arm or crank A.

By means of this crank-coupling A, any churn or other machine which has a rotary motion and is provided with a hand-crank can readily be connected with an animal-power without the intervention of pulleys or gearing and without removing the hand-crank from the machine, so that when the machine is not being driven by the power it will be in order to be worked by hand. Again, no nice adjustment is necessary to attach the machine to the power. If the machine to be driven is constructed so that the shaft on which is its hand-crank is not at the same height as the shaft which carries the connecting-crank A, the elongated slot $d$ in said connecting-crank will admit of the hand-crank, as it is rotated, adjusting itself. It also very frequently happens, when driving a machine which has a balance-wheel by other devices than a slotted connecting-crank such as I have described, that the machine, by reason of the momentum of the balance-wheel, will at times run ahead of the power which drives it, thereby producing irregularity, shocks, and jars. This is obviated by my slotted connecting-crank A, as the guard $f$ will hold back the machine against such tendency to run ahead, and when the brake is applied to the power both the power and the machine driven by it will stop at the same time.

I do not abandon or dedicate to the public any patentable feature set forth herein and not hereinafter claimed, but reserve the right to claim the same either in a reissue of any patent that may be granted upon this application or in other applications for Letters Patent that I may make.

Having thus described my invention, I claim as new and desire to secure by Letters Patent—

1. A crank-coupling for transmitting motion from one rotating shaft to another shaft provided with a hand-crank, the same consisting of a connecting-crank having an elongated slot in it arranged to run in direction of the length of it and in parallel relation with the axis of its eye or hub for reception of the handle portion of the hand-crank within it, substantially as specified.

2. The connecting-crank A, bent and twisted, as at e, in proximity to its eye or hub b, and having its outer or free end portion bent over and back to form a guard, f, and elongated slot or opening d, in parallel relation with the axis of the eye or hub of the crank, essentially as and for the purposes described.

ELY E. HYATT.

Witnesses:
W. L. MERWIN,
S. M. McCORMICK.